United States Patent [19]
Raab et al.

[11] Patent Number: 5,336,877
[45] Date of Patent: Aug. 9, 1994

[54] CONTACTING DEVICE FOR STANDARD CHIP CARD AND SIM CARD

[75] Inventors: Eberhard Raab, Bad Wimpfen; Manfred Reichardt, Weinsberg; Bernd Schuder, Schwaigern, all of Fed. Rep. of Germany

[73] Assignee: Amphenol-Tuchel Electronics GmbH, Fed. Rep. of Germany

[21] Appl. No.: 27,151

[22] PCT Filed: Sep. 18, 1991

[86] PCT No.: PCT/EP91/01778
§ 371 Date: Mar. 18, 1993
§ 102(e) Date: Mar. 18, 1993

[87] PCT Pub. No.: WO92/05513
PCT Pub. Date: Apr. 2, 1992

[30] Foreign Application Priority Data

Sep. 18, 1990 [DE] Fed. Rep. of Germany ....... 4029576

[51] Int. Cl.⁵ .......................................... G06K 13/00
[52] U.S. Cl. ...................................... 235/475; 235/441; 235/482; 235/483; 235/484; 235/485; 235/492

[58] Field of Search ............... 235/441, 482, 475, 483, 235/484, 485, 492

[56] References Cited

U.S. PATENT DOCUMENTS 4,907,257 3/1990 Asano et al. .......................... 379/144
4,976,630 12/1990 Schuder et al. ...................... 439/260

FOREIGN PATENT DOCUMENTS

0352177 1/1990 European Pat. Off. .
3804361 9/1988 Fed. Rep. of Germany .
3810275 10/1989 Fed. Rep. of Germany .
9012889.3 1/1991 Fed. Rep. of Germany .

Primary Examiner—Harold Pitts
Attorney, Agent, or Firm—Bacon & Thomas

[57] ABSTRACT

The contacting device described is designed to contact the contacts of boards of different sizes with preferably the same contact pattern, using a chip board reader which is adapted by means of a board holder, preferably a SIM board holder, in such a way that the SIM board can be read with the chip board reader.

20 Claims, 10 Drawing Sheets

CONTACTING DEVICE FOR STANDARD CHIP CARD AND SIM CARD

BACKGROUND OF THE INVENTION

This invention relates to a contacting device for standard chip cards (in the following referenced as "chip cards") and SIM cards widely used in the area of communications.

For example, the German Patent DE 38 04 361 discloses a value card having a semiconductor chip disposed on a removable insert portion thereof the dimensions of the insert being substantially smaller than those of the value card. The insert portion may be used in a latched position together with the surrounding value card in conventional value card applications and, when removed from said value card, it may be used as independent mini chip card (SIM card) substantially smaller devices. This arrangement is disadvantageous because of the fragility of the SIM card when used as a large chip card, and because the arrangement has a projection which is in the way and/or is irritating when the insert is used as a small card.

SUMMARY OF THE INVENTION

It is an object of the invention to provide a contacting device usable for both chip cards (being 54×85.6 mm in size) and SIM cards (being 15×25 mm in size). Both cards are used in communications and in particular in mobile telephone systems such as the telephone D network in Germany. The present invention provides a contacting device wherein according to one embodiment, the telephone user can decide which type of card he wants to use, and wherein according to other embodiments, the telephone manufacturer decides the type of card for which the telephone will be modified. In principle, it is an object of the invention to provide a contacting device for a (standard) chip card, or SIM card, respectively, such that optionally a chip card or a SIM card may be used.

Alternatively, it should be possible to easily adapt a chip card reader (i.e. a contacting device for a standard chip card) for use as SIM card reader.

To overcome one or more of the above mentioned problems, according to the present invention, a carrier or receiving means is provided which is used for the adaption of a chip card reader as a SIM card reader.

According to one embodiment of the invention this carrier is provided in the form of a card receiving means in which the SIM card is inserted, the SIM card being bonded thereto by means of an adhesive foil.

According to another embodiment of the invention the receiving means is incorporated in a chip card reader, and the SIM card may be inserted into the receiving means by being brought into contact with the contact elements of the chip card reader.

According to the invention, a basically known chip card reader (i.e. a reader for contacting a standard chip card), preferably of the kind disclosed in DE-OS 38 10 275, which corresponds to U.S. Pat. No. 4,976,630 is used and said receiving means is inserted into the conventional chip card reader. The receiving means may be guided in a bottom side of the chip card reader or it may be inserted into the chip card reader instead of a chip card.

BRIEF DESCRIPTION OF THE DRAWINGS

The foregoing and other features of the present invention will become more apparent to one skilled in the art upon consideration of the following description of the invention with reference to the accompanying drawings, wherein:

FIG. 17 is a side elevational view of the illustration of FIG. 9.

DETAILED DESCRIPTION OF THE PREFERRED EMBODIMENTS

Figure 1:
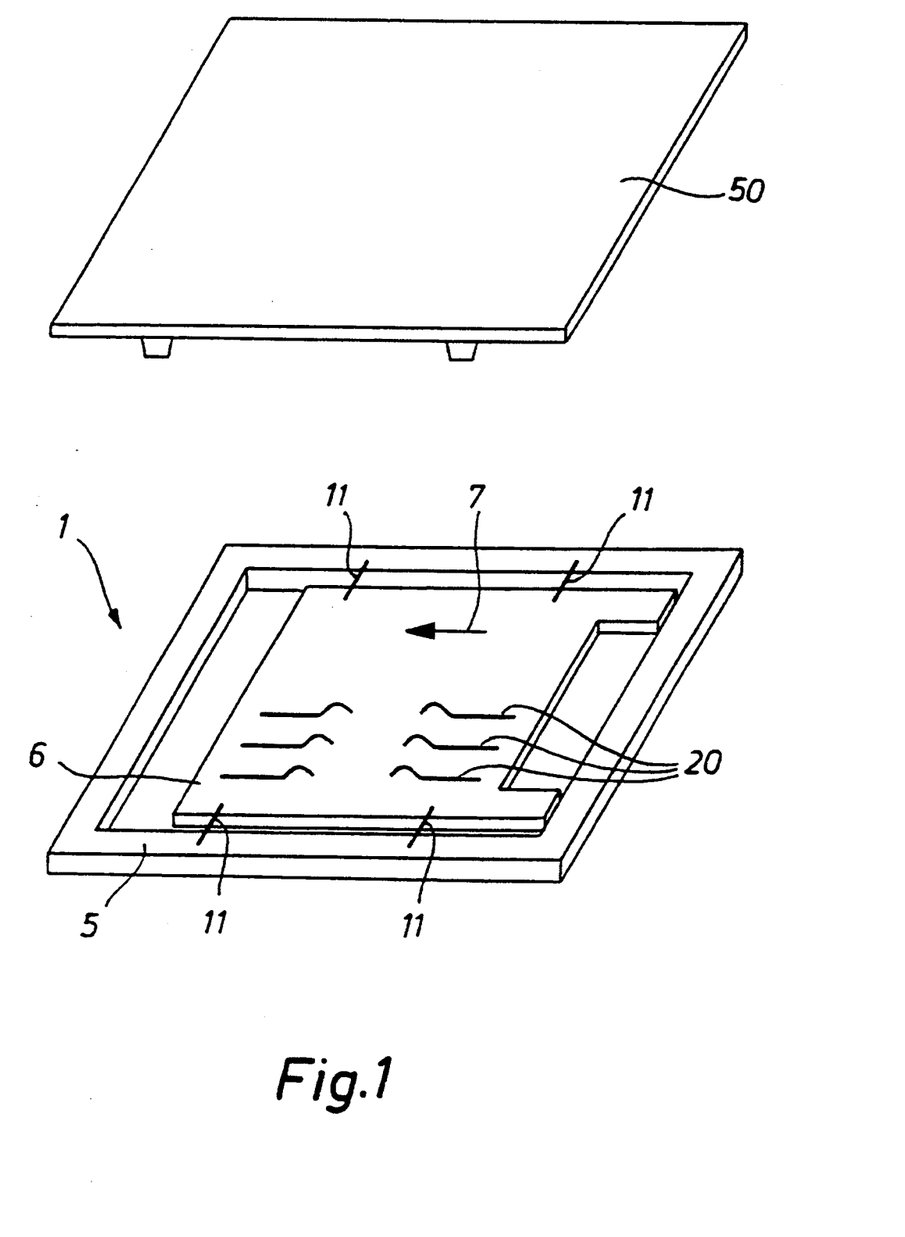
FIG. 1 is a schematic illustration of a chip card reader according to DE-OS 38 10 275.

FIG. 1 depicts a conventional chip card reader 1 described in detail in DE-OS 38 10 275 and its equivalent, U.S. Pat. No. 4,976,630. While this particular chip card reader is described and explained in the following, the invention is not limited to its application to this chip card reader.

The chip card reader 1 (for standard chip cards) comprises a frame 5 in which a contact carrier 6 is reciprocatably mounted. The contact carrier 6 is biased by a spring (not shown) towards its position as shown. The contact carrier 6 is supported in the frame 5 by means of schematically shown guiding means 11 such that during a movement of said contact carrier 6 in the direction of arrow 7 it is lifted slightly upwards towards the bottom part 50. When using a standard chip card, the movement in the direction of arrow 7 is usually effected by insertion of the chip card. The bottom part 50 may be latched to the frame 5 but it may also be provided by the apparatus in which the chip card reader is incorporated.

Figure 2:
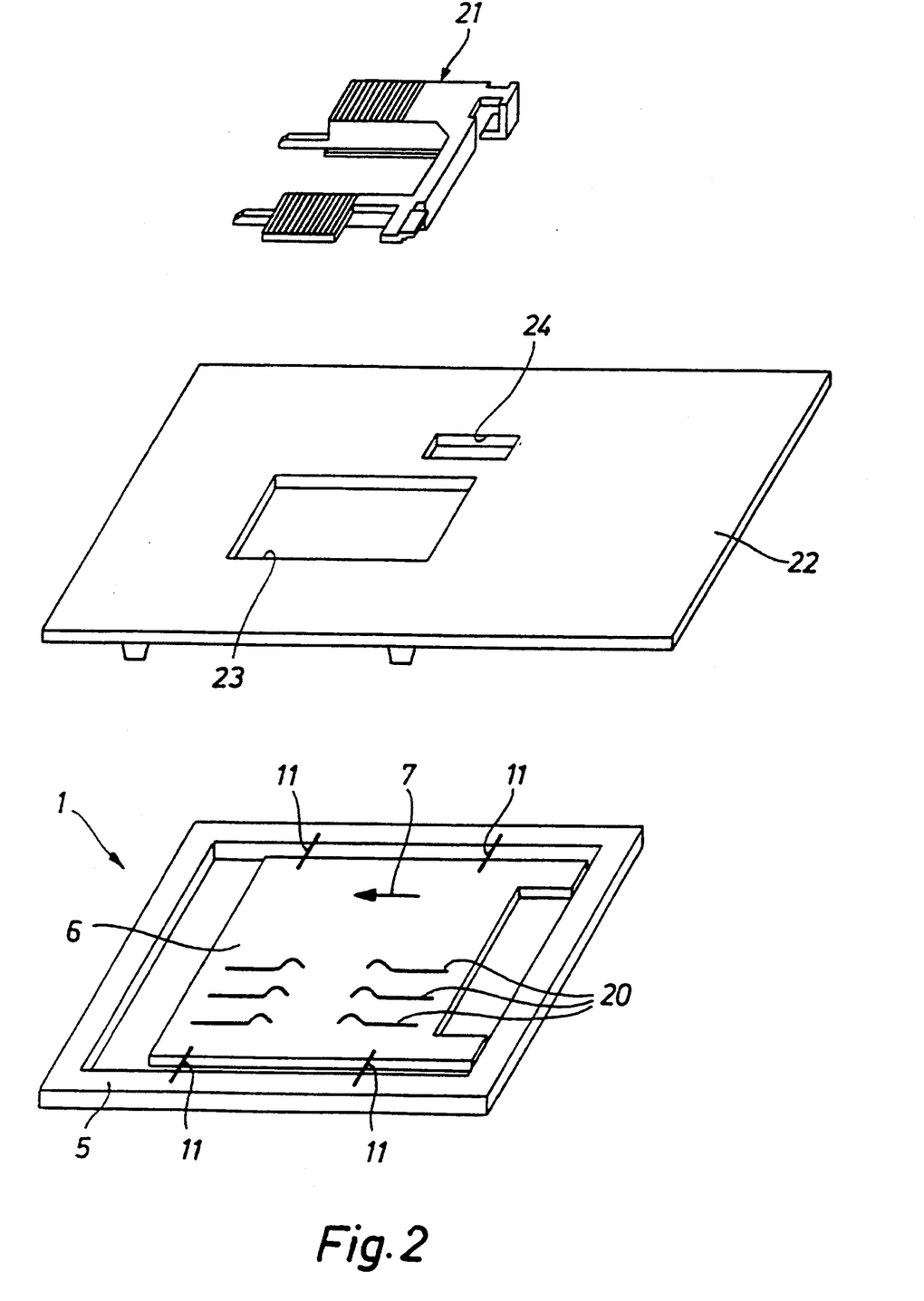
FIG. 2 is a schematic illustration of a first embodiment of the invention to convert a conventional chip card reader into a SIM card reader.

FIG. 2 shows a first embodiment of the invention in accordance with which a chip card reader, preferably one according to DE-OS 38 10 275, may be modified such that it is usable for reading SIM cards, thus forming a SIM card reader. To this end, in accordance with the present invention, a SIM card receiving means 21 is provided which is reciprocatably supported in and cooperates with a bottom part 22 of the chip card reader 1.

The chip card reader 1 is designed as described with reference to FIG. 1 except that the bottom part 50 of FIG. 1 is now modified as will be described in connection with bottom part 22.

Figure 3:
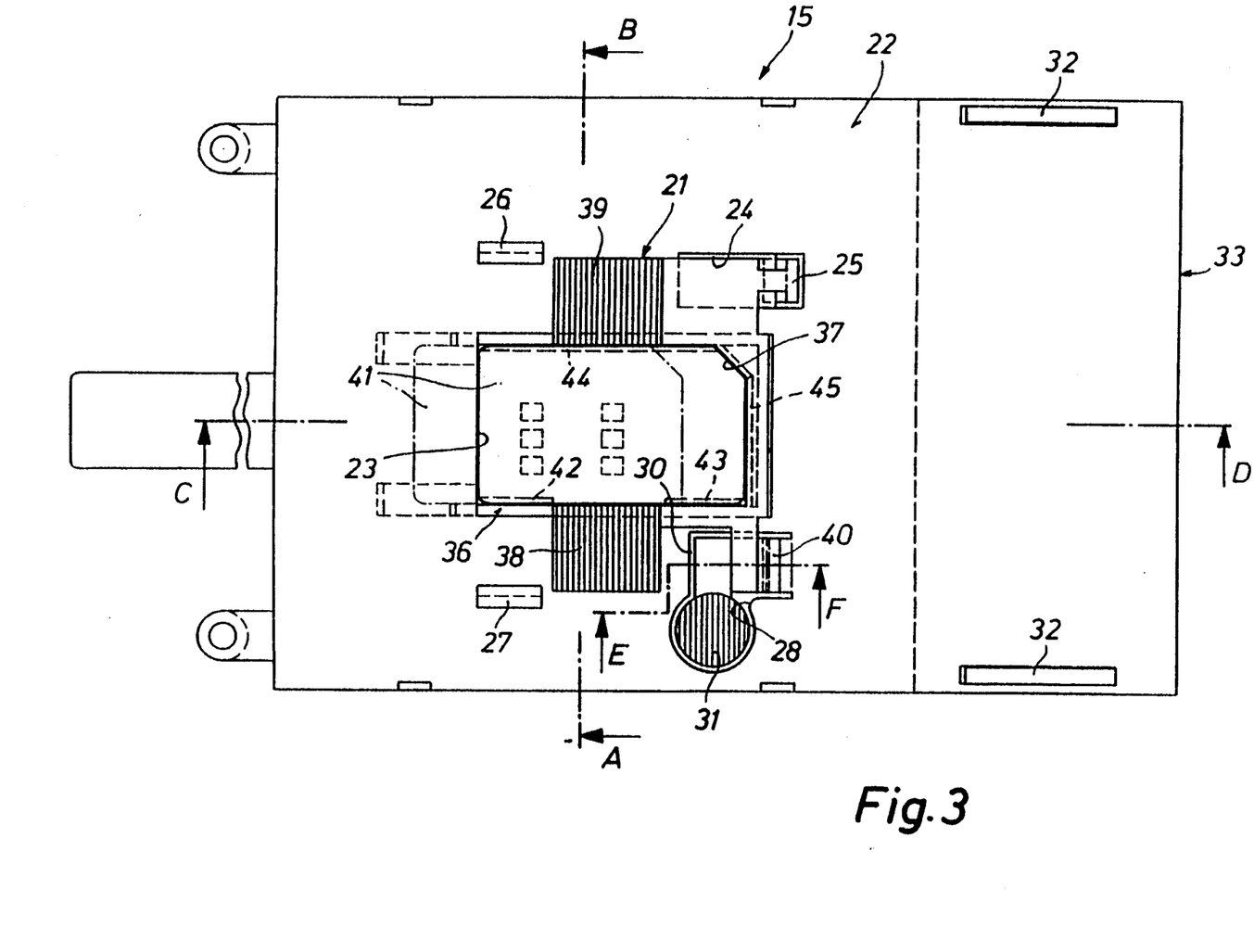
FIG. 3 is a top plan view of the assembled SIM card reader of FIG. 2.

FIG. 3 is a top plan view of the bottom part 22 having a generally rectangular insert opening 23 provided therethrough. A further generally rectangular opening 24 is formed in the bottom part 22 to enable penetration of a catch 25 of the SIM card receiving means 21. Also, two upwardly projecting guiding rails are disposed on the surface of bottom part 22 in a diametrically opposed relationship. Further, a stop or abutment (not shown) may be provided adjacent to the right (as seen in FIG. 3) edge of the opening 23. A slot 28 in the bottom part defines a latching spring means 29 preferably consisting of bottom part material and comprising a latching edge 30 as well as a release key or button 31 which may have a serrated surface. The bottom part 22 further comprises FIG. 3 downwardly offset guiding rails 32 for a standard chip card in case such a chip card is to be inserted. Also for this purpose, an insert slot 33 is formed which is not specifically shown in FIG. 3.

The SIM card receiving means 21 is preferably made of plastic material, as is the bottom part 22, and may be inserted into the insert opening 23.

Figure 5:
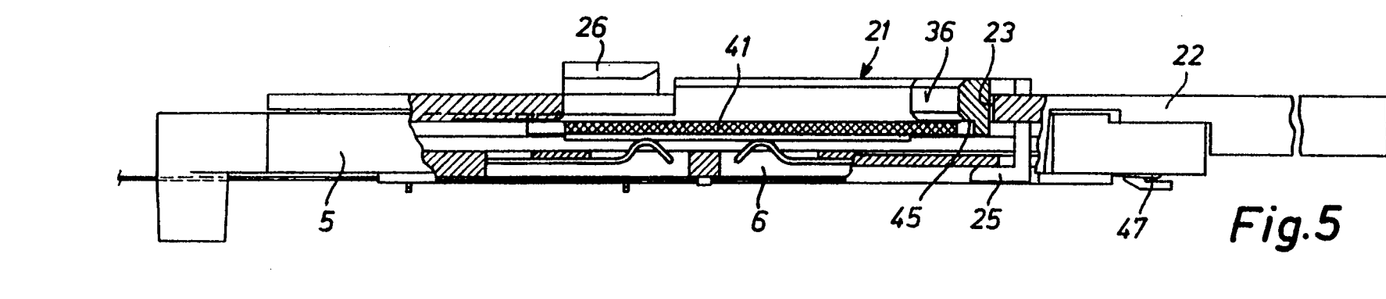
FIG. 5 is a sectional view taken along line C-D in FIG. 3, the insertion/removal position being shown for the SIM card application.

The SIM card receiving means 21 includes a frame portion 36 protruding through the insert opening and two wing portions 38, 39 on which the SIM card receiving means 21 is supported on the surface of the bottom part 22. Serrated surfaces are provided on the wing portions 39 to aid shifting or sliding the SIM card receiving means 21. Opposite to said serrated sur%ace, wing portion 39 comprises the above mentioned hook-shaped catch 25 projecting through said rectangular opening 24 to reach behind the contact carrier 6, as shown for example in FIG. 5. The other wing portion forms a latching tab for cooperation with the latching edge 30 of the latching spring means 29.

Opening 37 formed by said SIM card receiving means 21 corresponds to a SIM card 41 with respect to size and shape. If a SIM card 41 is inserted in said SIM card receiving means 21, the latter is supported on rests or steps formed along the longitudinal sides of the frame portions 36. Rest 44 extends along the entire longitudinal side thereof whereas rests 42 and 43 are only formed in the areas shown. In the area of one transversal (or small) side of the opening 37 of the SIM card receiving means 21, a step 45 is formed for taking up or counteracting against the contact forces.

Figure 6:
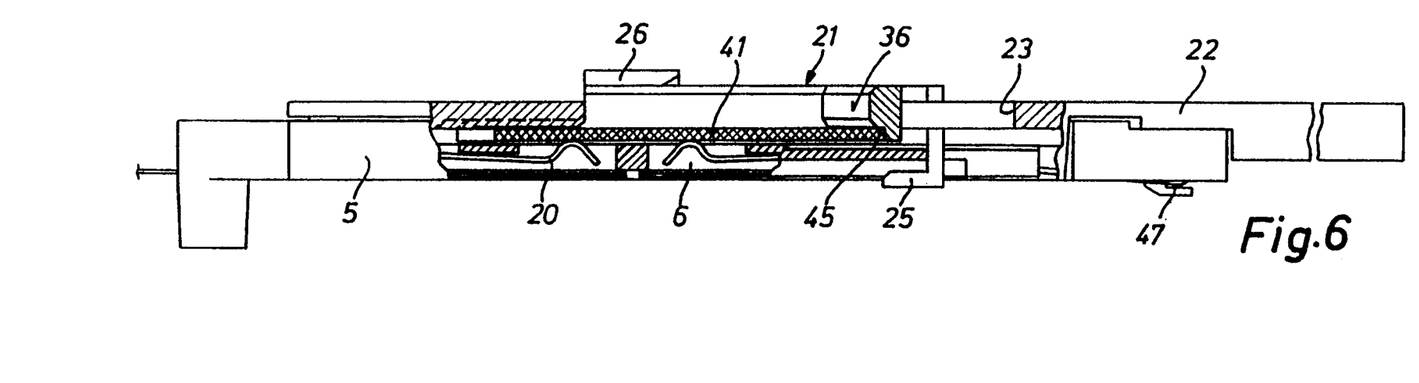
FIG. 6 is a sectional view taken along line C-D in FIG. 3, showing the reading position.
Figure 7:
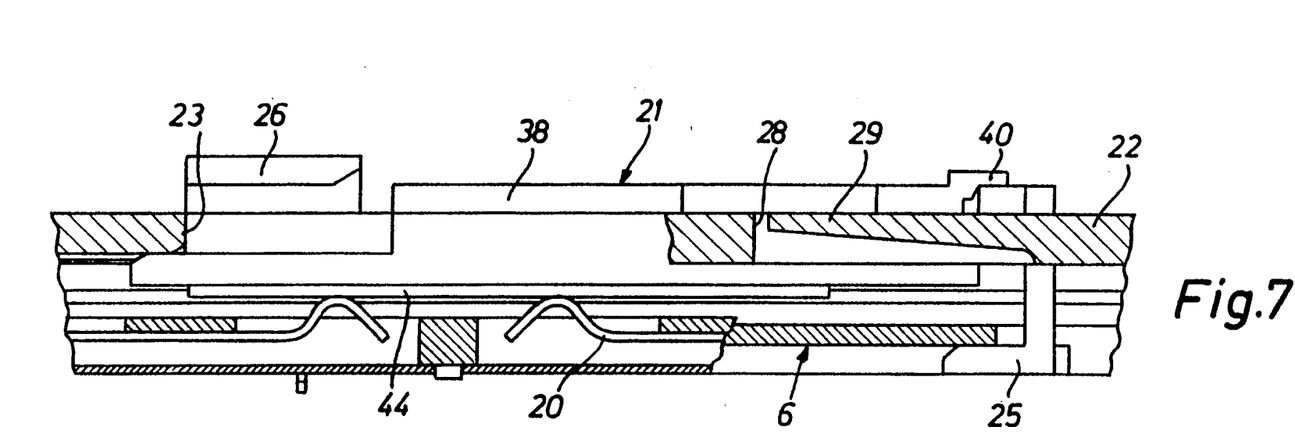
FIG. 7 is a sectional view taken along line E-F in FIG. 3, the SIM card being shown in its insertion/removal position.
Figure 8:
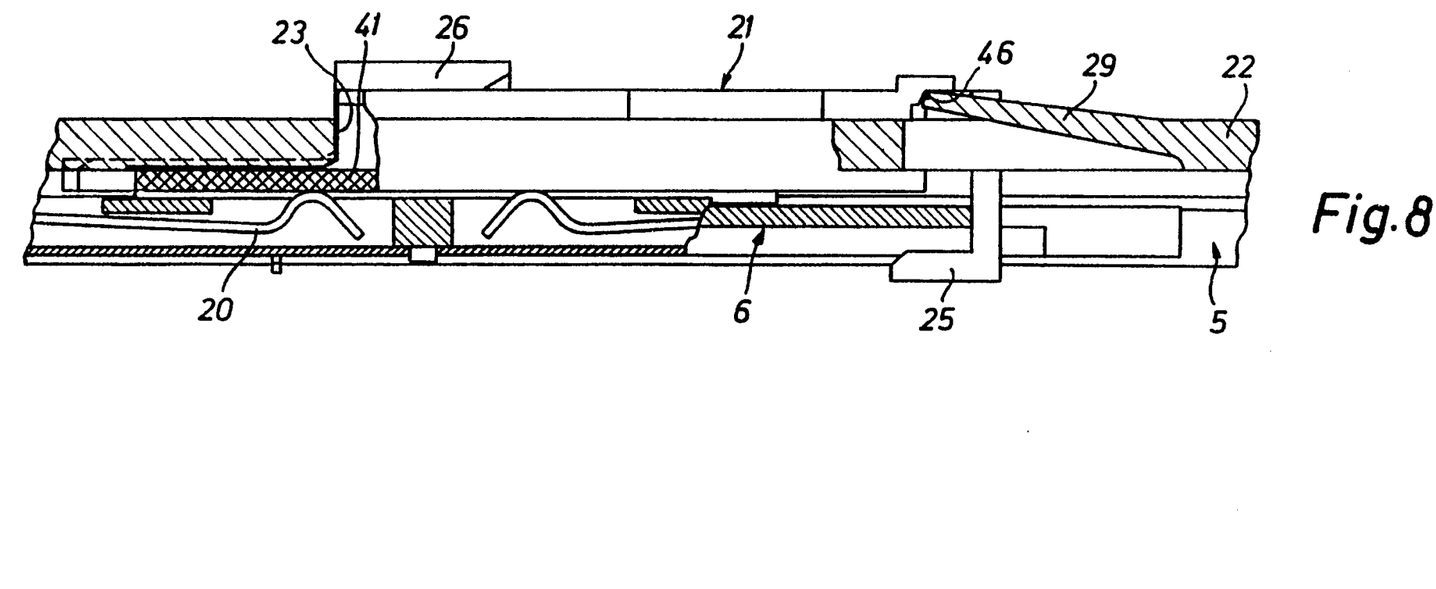
FIG. 8 is a sectional view taken along line E-F in FIG. 3, the SIM card being shown in its reading position.

For an explanation of the function, reference should particularly be made to FIGS. 5 to 8, FIGS. 5 and 7 showing the SIM card receiving means 21 in its insertion/removal position, and FIGS. 6 and 8 snowing the SIM card receiving means in its reading position.

In all of the above-described illustrations, the SIM card receiving means 21 is already inserted in the bottom portion 22 which usually is attached to the contact carrier by means of hinges only indicated schematically in the drawings.

Figure 4:
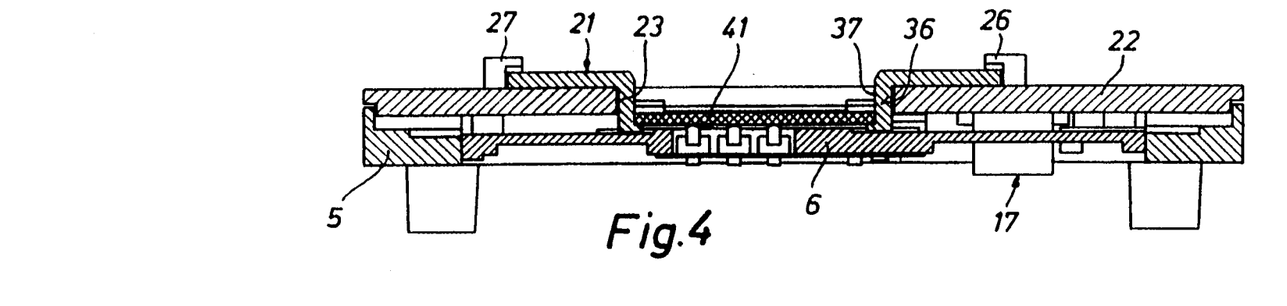
FIG. 4 is a sectional view taken along line A-B in FIG. 3.

Operation of this embodiment described is as follows: After the SIM card 41 is inserted in the opening 37, it is supported on rests or steps 42 to 44, as can be seen in FIG. 4. The latching spring means 29 is therein underneath one of the wing portions and pushes said one wing portion in an upwardly direction, as shown in FIG. 7. When shifting or sliding the SIM card receiving means 21 to the left into the position shown in FIGS. 6 and 8, the SIM card 41 follows the movement of the receiving means due to the catch 25 such that the contact elements 20 of the contact carrier 6 move into engagement with the contact zones of the SIM card 41. In this movement, the leading portion of wing portions 38 and 39 is guided in each of guiding rails 26 and 27, which then reach around or embrace wing portions 38 and 39.

In the reading position shown in FIGS. 6 and 8 the SIM card receiving means 21 is latched by the latching spring means 29 which abuts a latching recess 46 of a latching tab 40. To release the SIM card receiving means 21 from its reading position, the latching spring means 29 is pressed downwards by means of the release key or button 31 such that the contact carrier 6 together with the SIM card receiving means 21 returns to its insertion/removal position under the influence of the force of a spring 47 (FIG. 5) which biases the contact carrier 6 in a conventional manner towards its insertion/removal position.

The contact forces are taken up or counteracted on the one hand by a step in the bottom part 22 and on the other hand by a step in the bottom part and a step 45 in the card receiving means which moves over the edge of said SIM card 41 when slid into the reading position.

The SIM card reader 15 of this embodiment without the SIM card receiving means inserted, may readily be used as a chip card reader 21 for normal sized standard chip cards which may be inserted through the insertion slot shown at 33.

FIGS. 9, 10, 11 and 17 show a second embodiment of the invention which provides a reading device adapted for use optionally with a large card (standard chip card) or a small card (SIM card). In accordance with the present invention, an insert or card receiving means to be described is provided which is to be inserted in a conventional chip card reader 1 to modify the chip card reader 1 for use with a SIM card. Preferably, the insert according to the invention is again used with a chip card reader 1 as disclosed in DE-OS 38 10 275. The conventional chip card reader without the associated bottom part is again given reference numeral 1. In accordance with the invention, bottom part 51 is modified with respect to bottom part 50 of the conventional chip card reader 1. Bottom part 51 is extended in the direction of movement of the contact carrier 6 and, similar to the first embodiment, forms guiding rails 32 and an insertion slot 33. Also, an opening 52 through the bottom part 51 is provided for insertion of a SIM card 41. On the surface of the bottom part 51, a receiving recess 53 is provided extending in a transverse direction with respect to the movement of direction of the contact carrier.

A chip card receiving means or insert 54 is inserted the chip card reader 1 instead of a standard chip card and is positioned between the contact carrier 6 and bottom part 51. The card receiving means 54 has an opening 55 having the size and shape of SIM card 41 such that the SIM card may be inserted into the opening 55. Opening 55 is positioned in the card receiving means 54 to enable a contacting condition of the contacts of said SIM card 41 upon a shifting or sliding movement of the receiving means 54 into the reading position shown in FIG. 10.

Attached to the card receiving means 54 is a lid or cover 56 having a handle or gripping rail 57. Preferably and as shown, insert 54 and cover 56 are made of one single piece of plastic material.

Figures 9, 9A:
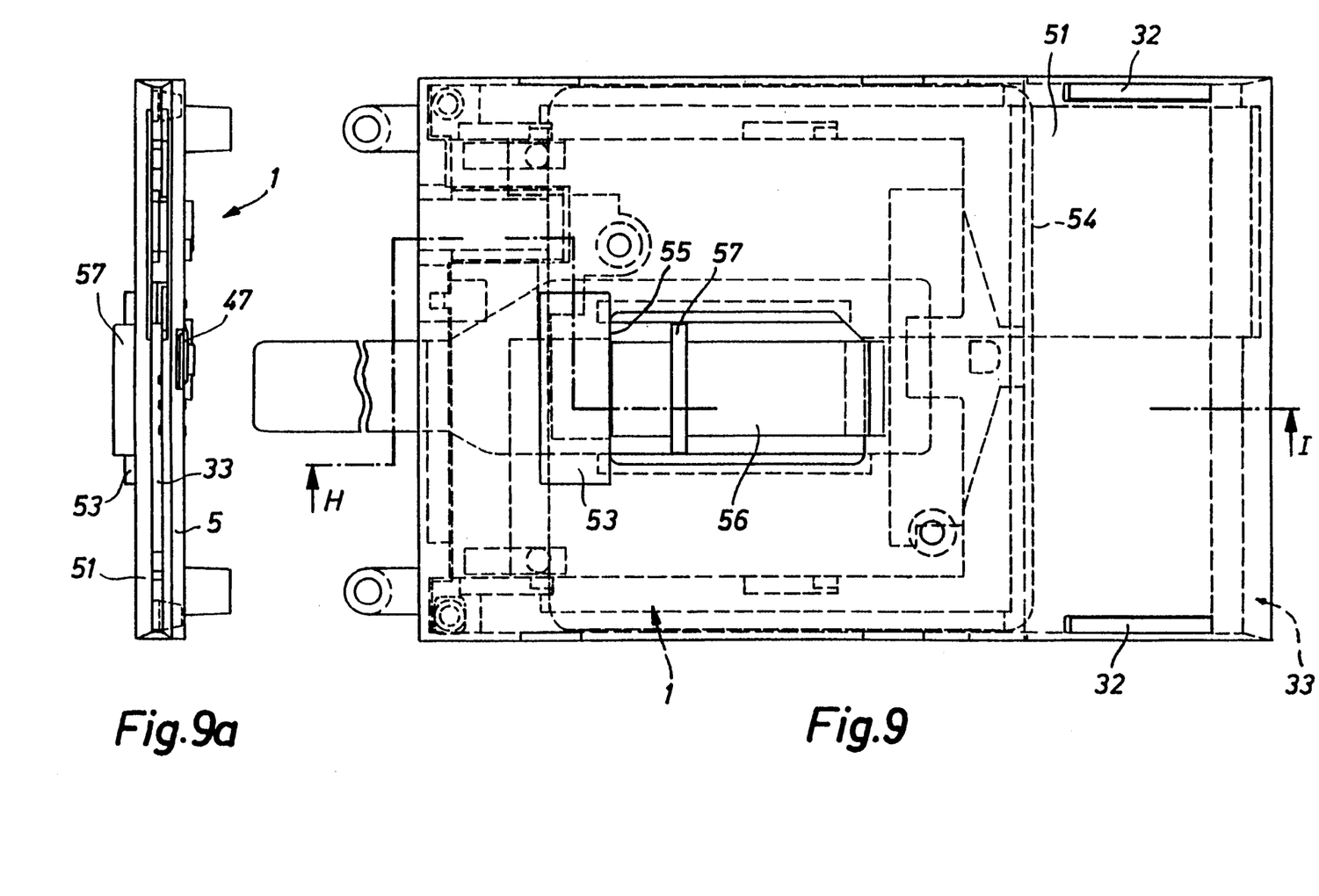
FIG. 9 is a top plan view of a SIM card reader in a second embodiment of the invention.
Figure 10:
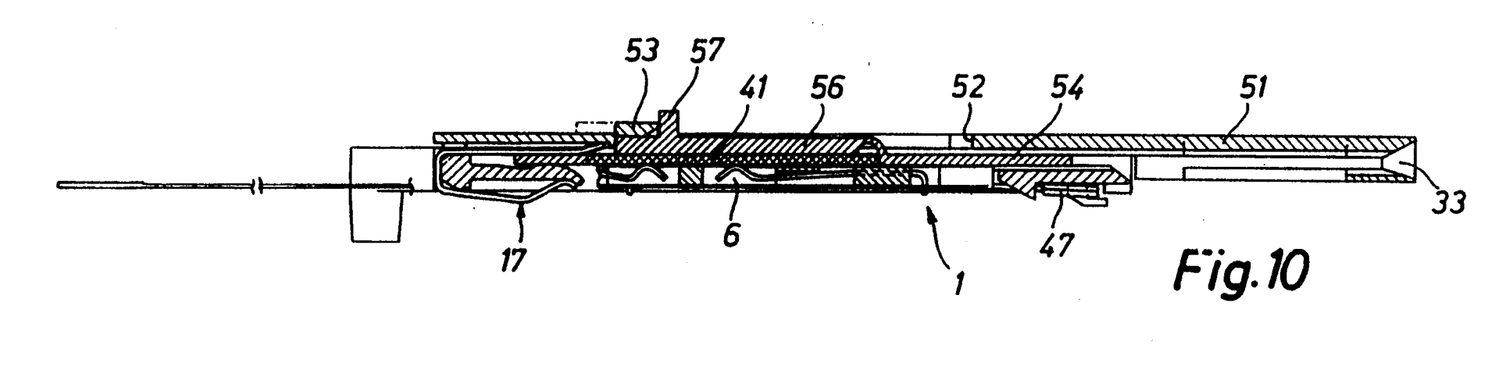
FIG. 10 is a sectional view taken approximately along line H-I in FIG. 9, the SIM card being already in its reading position.
Figure 11:
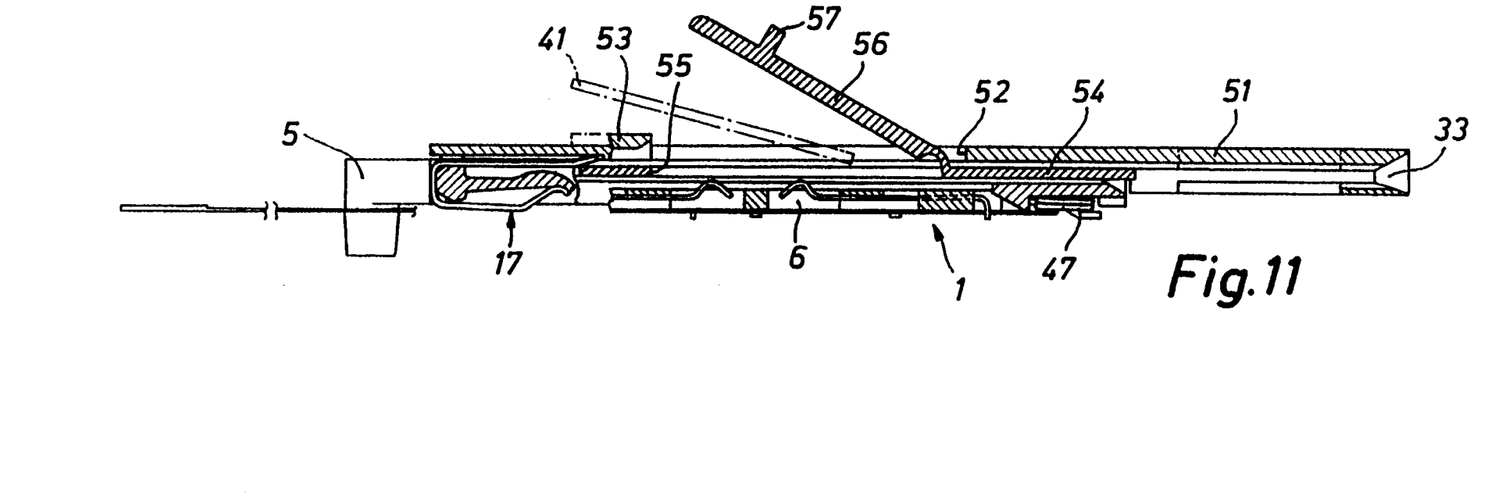
FIG. 11 is a sectional view taken along line H-I in FIG. 9, showing the insertion the SIM card.

FIGS. 9 to 11 show a SIM card reader which, when the insert 54 is removed, may readily be used as a standard chip card reader. When used as a SIM card reader, the SIM card is inserted into the opening 55 in the insertion/removal position of FIG. 11 with the cover 56 opened. The cover 56 is then closed and the SIM card is shifted or slid into the reading position as shown in FIG. 10. In the reading position, the leading edge (as seen in direction of movement) of the cover 56 is moved into receiving recess 53 to maintain cover 56 in its closed position. Since also the leading edge (as seen in direction of movement) of the insert moves into a brake means 17, the spring 47 biasing contact carrier 6 towards its insertion/removal position cannot move said contact carrier 6 out of its reading position.

If the SIM card is to be removed, the user grips the handle or gripping rail 57 shown in FIG. 10 and moves it towards the right until the insertion/removal position shown in FIG. 11 is reached.

In this particular embodiment and also in the first embodiment, the manufacturer, for example the telephone manufacturer, decides which card format or size is to be used. Accordingly, insert 54 also referenced as card receiving means is or is not incorporated.

FIGS. 12 to 16 show a third embodiment of the invention wherein the user may decide if he wants to use a (standard) chip card or a SIM card. Here also a conventional chip card reader 1 is used which in this embodiment does not have to be modified at all. Only the bottom part 61 is extended in a manner as shown in FIGS. 14 to 16 and again forms guidings rails 32 and an insertion slot 33.

Figure 12:
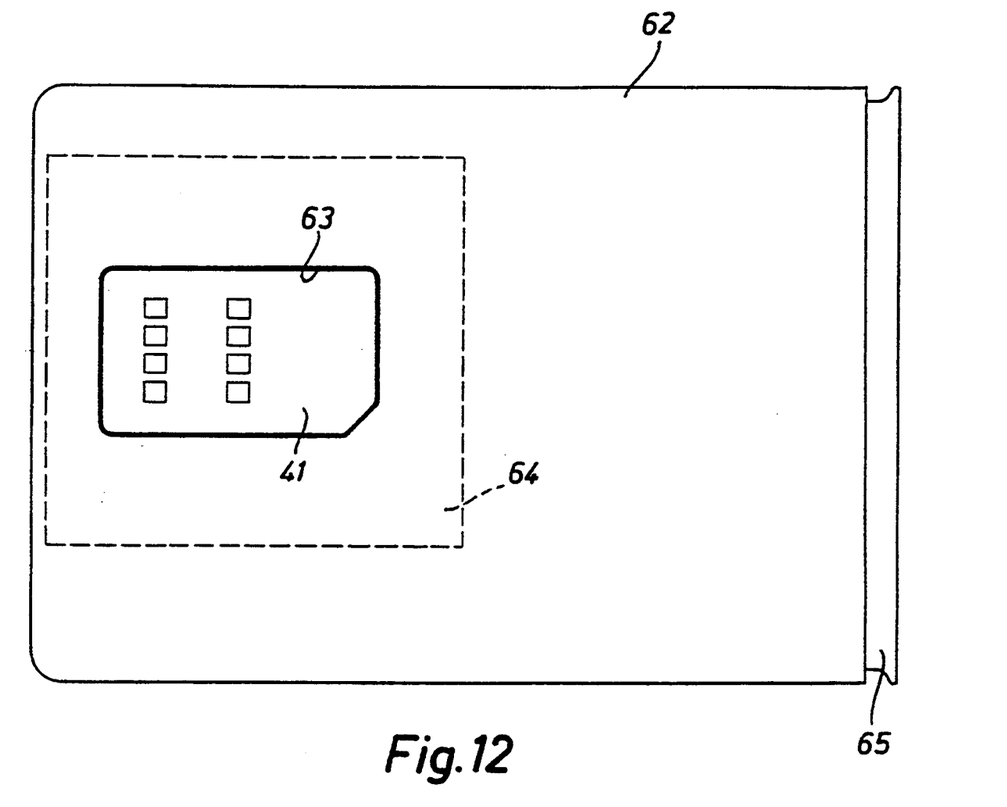
FIG. 12 is a top plan view of a card receiving means of a third embodiment of the invention into which a SIM card is inserted, the SIM card being attached to the card receiving means by means of an adhesive foil.
Figure 13:
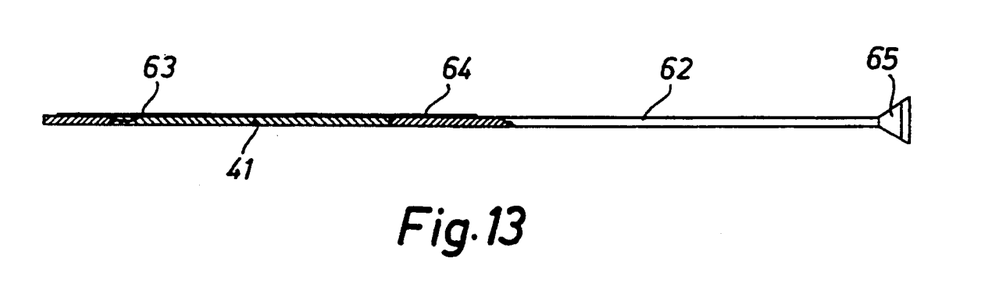
FIG. 13 is a side elevational view of the card receiving means of FIG. 12.
Figure 14:
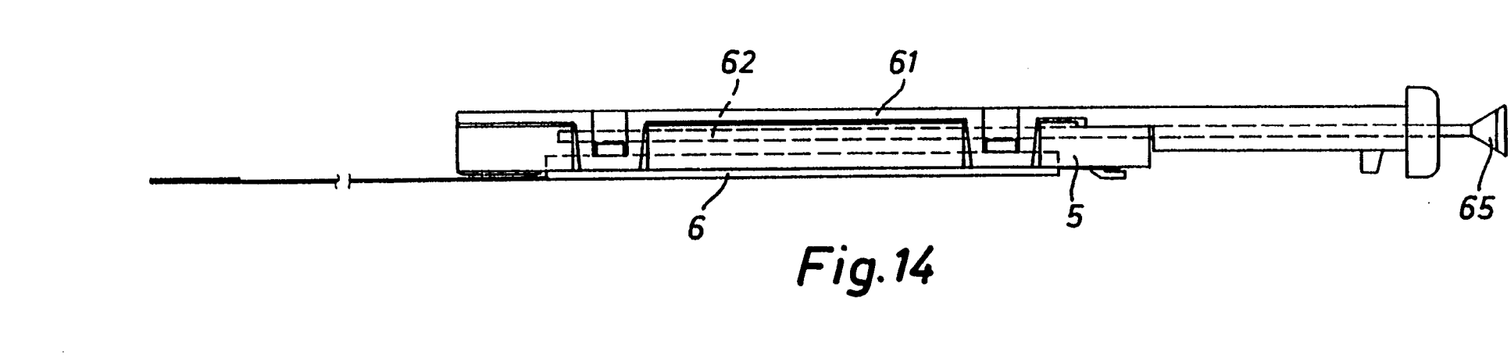
FIG. 14 is a side elevational view of the device shown in FIG. 16 which may be used as a chip card reader as well as a SIM card reader during insertion of the card receiving means.
Figure 15:
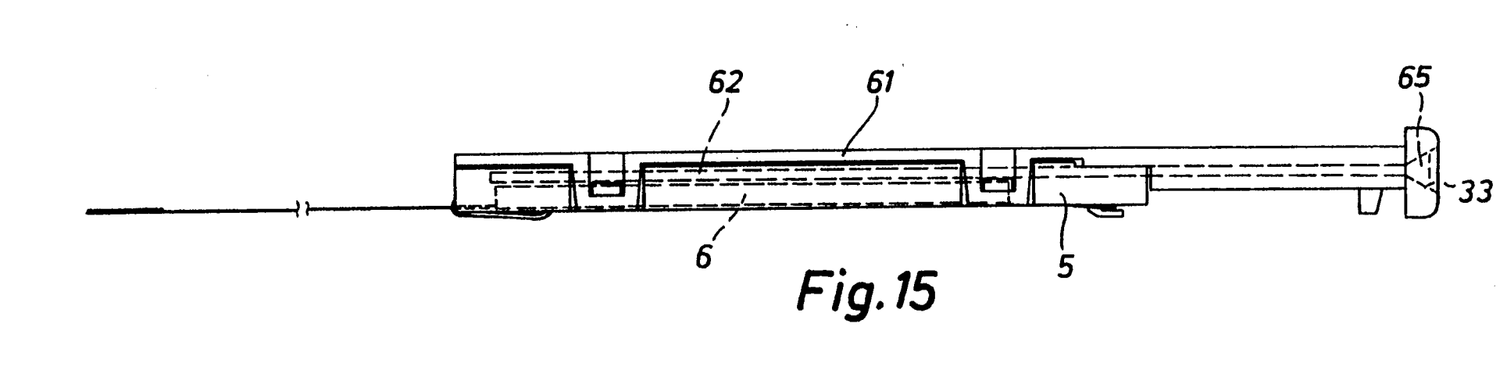
FIG. 15 is a view similar to FIG. 14, the card receiving means being fully inserted.
Figure 16:
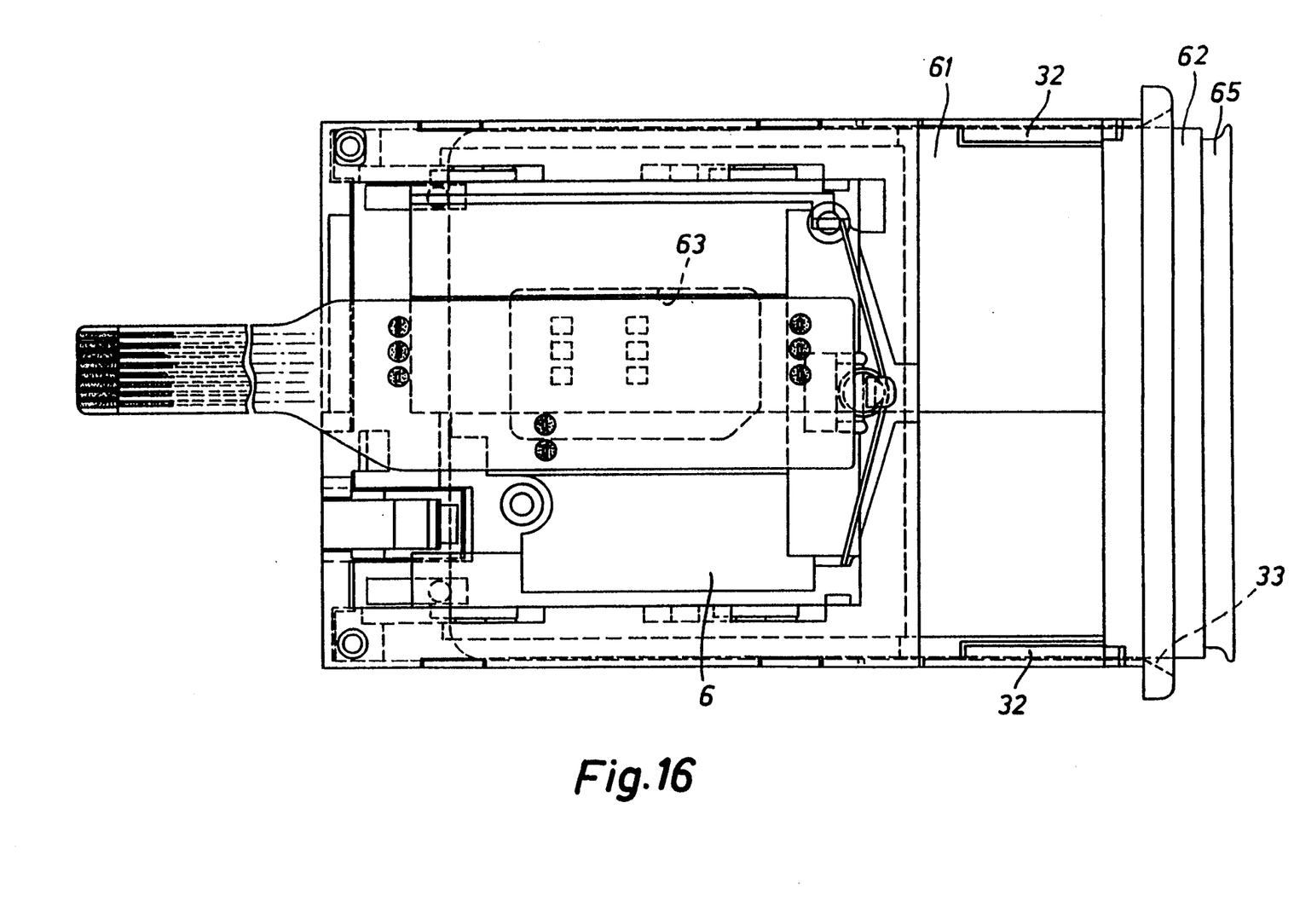
FIG. 16 is a plan view of the chip card/SIM card reader from beneath as seen in FIG. 14 (the plan view of FIG. 16 is thus seen in an opposite direction as the top plan view of FIG. 3)

FIGS. 12 and 13 show an insert or card receiving means 62 which may be inserted into the insertion slot 33 instead of a (standard) chip card. The insert 62 comprises a recess 63 for receiving a SIM card 41 therein and orientation thereof. The bottom of recess 63 is formed by an adhesive foil 64 which securely holds the SIM card 41 in position. On the trailing end (as seen in direction of movement during insertion into the chip card reader) the insert 62 comprises a handle or gripping rail 65 which impedes or prevents a removal of the SIM card. Also, the opening or insert slot 33 is closed thereby thus providing protection against entering of dust and/or water into the chip card reader. If a (large) standard chip card is to be used instead of a SIM card, the insert or card receiving means 62 is simply omitted.

We claim:

1. A contacting device for contacting cards having card contacts arranged in a same pattern, comprising a chip card reader which includes means for reading a chip card and card receiving means for receiving a card which has a different size from that of said chip card, wherein said card receiving means has the form of a chip card and comprises means defining a recess into which the different size card is inserted, and further comprising means consisting of an adhesive foil for retaining said different size card in said recess.

2. A contacting device as claimed in claim 1, wherein said card receiving means comprises a handle or gripping rail.

3. A contact device for contacting cards having card contacts arranged in a same pattern, comprising a chip card reader having a reciprocatable contact carrier, said chip card reader including means for reading a chip card, said chip card reading means including a card receiving means for enabling said chip card reader to read a different size card and, a bottom part for said chip card reader, said bottom part having an insert opening separate from the chip card opening in the reader formed therein, and further comprising means for shiftably or slidably mounting the card receiving means in said bottom part such that upon a shifting or sliding movement of said card receiving means together with said different size card, said contact carrier of said chip card reader is also moved such that the contacts thereof become seated on said card contacts.

4. A contacting device as claimed in claim 3, further comprising retaining means for holding said card receiving means in a reading position upon said shifting or sliding movement of said card receiving means from an insertion/removal position into said reading position.

5. A contacting device as claimed in claim 3, wherein said retaining mans is formed by a latching spring means.

6. A contacting device as claimed in claim 3, wherein said retaining means is formed by retaining means of said chip card reader.

7. A contacting device as claimed in claimed in claim 3, further comprising support means for supporting or taking up or counteracting contact forces created in said reading position.

8. A contact device as claimed in claim 7, wherein said support means is formed by a step in said bottom part (or broad).

9. A contacting device as claimed in claim 7, wherein said support means is formed by a step in said card receiving means which, in said reading position, is arranged to move over an edge of said different size card upon said shifting or sliding movement of said card receiving means into said reading position.

10. A contacting device as claimed in claim 3, wherein said card receiving means comprises a frame portion for receiving said different size card, and two wing portions extending towards a surface of said bottom part.

11. A contacting device as claimed in claim 10, wherein a catch is formed on said frame portion reaching behind said contact carrier.

12. A contacting device for contacting cards comprising card contacts to be contacted, said cards having different sizes and said card contacts being preferably arranged in the same pattern, comprising a chip card reader adapted for reading a standard chip card, said chip card reader further being adapted by means of a card receiving means to accommodate a standard chip card or a card having a different from the chip card, wherein said different size card receiving means is integral with said chip card reader, said card receiving means comprising an opening for receiving the different size card, and further comprising means including a cover or lid for closing said opening, said cover or lid forming a stop or abutment for the inserted different size card.

13. A contact device as claimed in claim 12, wherein said card receiving means is integrated into said chip card reader, and wherein said different size card may be inserted into said card receiving means.

14. A contacting device as claimed in claim 12, wherein said chip card reader comprises a bottom part (or board) having an opening formed therein, through which said different size card may be inserted into said card receiving means.

15. A contacting device as claimed in claim 12, wherein said card receiving means is shiftably or slidably mounted in said bottom (or board) such that upon a shifting or sliding movement of said card receiving means together with said different size card, said contact carrier of said chip card reader is also moved such that the contacts thereof become seated on said card contacts.

16. A contacting device as claimed in claim 12, further comprising retaining means for holding said card receiving means in a reading position upon said shifting or sliding movement of said card receiving means from an insertion/removal position into said reading position.

17. A contacting device as claimed in claim 3, wherein said retaining means is formed by a retaining means of said chip card reader.

18. A contacting device as claimed in claim 1, wherein the different size card is a SIM card.

19. A contacting device as claimed in claim 3, wherein the different size card is a SIM card.

20. A contacting device as claimed in claim 12, wherein the different size card is a SIM card.

* * * * *